United States Patent
Leichsenring

(10) Patent No.: US 9,808,127 B2
(45) Date of Patent: Nov. 7, 2017

(54) MODULAR BATHROOM STRUCTURE

(71) Applicant: Davis Holland Leichsenring, North Bethesda, MD (US)

(72) Inventor: Davis Holland Leichsenring, North Bethesda, MD (US)

(*) Notice: Subject to any disclaimer, the term of this patent is extended or adjusted under 35 U.S.C. 154(b) by 0 days.

(21) Appl. No.: 15/136,302

(22) Filed: Apr. 22, 2016

(65) Prior Publication Data

US 2016/0235255 A1     Aug. 18, 2016

Related U.S. Application Data

(60) Provisional application No. 62/215,737, filed on Sep. 9, 2015.

(51) Int. Cl.

| | |
|---|---|
| *A47K 3/28* | (2006.01) |
| *A47C 11/00* | (2006.01) |
| *F16M 13/02* | (2006.01) |
| *A47C 16/02* | (2006.01) |
| *A47B 57/32* | (2006.01) |
| *A47C 9/06* | (2006.01) |
| *E04B 2/74* | (2006.01) |

(52) U.S. Cl.
CPC .............. *A47K 3/282* (2013.01); *A47B 57/32* (2013.01); *A47C 9/06* (2013.01); *A47C 11/00* (2013.01); *A47C 16/025* (2013.01); *A47K 3/281* (2013.01); *F16M 13/02* (2013.01); *E04B 2002/7485* (2013.01)

(58) Field of Classification Search
CPC ........ A47K 3/281; A47K 3/282; A47B 57/32; A47B 57/34; A47C 9/06; A47C 11/00; A47C 16/025; F16M 13/02

USPC ............................................................. 4/611
See application file for complete search history.

(56) References Cited

U.S. PATENT DOCUMENTS

| | | | | |
|---|---|---|---|---|
| 3,220,363 | A * | 11/1965 | Gingher ............... | A47B 96/027 108/108 |
| 4,337,540 | A * | 7/1982 | Lindeman .............. | A47K 3/282 4/612 |
| 4,881,471 | A * | 11/1989 | Schwartz ............... | A47B 57/30 108/147 |
| 5,337,525 | A * | 8/1994 | Zaccai .................... | A47K 3/282 4/611 |
| 5,950,371 | A * | 9/1999 | Rives .................... | A47B 57/402 108/108 |

(Continued)

*Primary Examiner* — Tuan N Nguyen

(74) *Attorney, Agent, or Firm* — Barry Choobin; Patent 360

(57) ABSTRACT

The various embodiments herein provide a modular shower seat connected to a wall structure comprising a mounting base component, a connecting elongated component and a primary functional component. The mounting base component is fixed against a wall structure through a holding medium. The mounting base component comprises a vertical base plate. The vertical base plate comprises a plurality of fastener holes and a plurality of vertical slots. The connecting elongated component is attached to the mounting base component through a plurality of fastening medium. The connecting elongated component comprises a pair of vertical bases. Each vertical base is orthogonally fixed to the vertical base plate by fitting the vertically opposite brackets into the vertically opposite slots of the vertical base plate. The primary functional component is fixed over the connecting elongated component.

12 Claims, 4 Drawing Sheets

(56) References Cited

U.S. PATENT DOCUMENTS

2011/0271439 A1* 11/2011 Hoernig ................ A47K 3/283
 4/612

* cited by examiner

MODULAR BATHROOM STRUCTURE

BACKGROUND

Technical Field of Invention

The embodiments herein generally relate to a utility article and particularly relates to a modular bathroom fixation with enhanced safety, cost effective and low maintenance features. The embodiments herein more particularly relate to a modular shower seat and other appurtenances connected to a wall structure without having direct connection to a wall surface having a support structure for a user from a wide range of age group and mobility condition.

Description of Related Art

A modern bathroom houses a lot of features for attraction and utility purpose including modular stands, waterproofing structures and safety handles. Most of these features are made up of translucent glass and heavy ceramics. Also for each feature a specific area has to be allotted which results into less space for bathing.

One of the prior arts discloses a shower seat for installation within a corner of a shower stall. The shower seat is constructed from a wide variety of rigid materials and is polygonal in shape, and wherein a horizontal corner strip of backboard of shower walls within the shower stall is removed to form a slot. A back portion of the shower seat is inserted into the slot such that the edges are against vertical wall studs supporting the backboard of the shower walls.

Another prior art discloses a shower bench that includes an L-shaped first brace with legs attached to vertical shower walls. A bench subassembly including a cross brace, a foam block, and a T-shaped beam made of cementitious bonding agent that adheres the cross brace to the foam block is provided which also adds strength to a front edge of the foam block. The brace and the block are cut to fit horizontally against the first brace with legs overlapping, such that the braces form a rigid geometric arrangement that supports the block. Ends of the braces are screwed together. The large uniform surfaces of the block are covered with tile and grout. The resulting assembly is extremely rigid and non-flexing, such that cracking of the tile and grout is substantially minimized, even when the bench is loaded up to 400 lbs.

Yet another prior art discloses a modular bathroom unit configured for comfort and spaciousness, with a relatively small footprint. The preferred embodiment of the present invention includes a commode, shower with floor drain, and a relatively large lavatory, which is configured to pivot to a vertical position for space savings when not in use, or to a horizontal position for use. Further contemplated is a unique drain connection system, wherein the lavatory drain includes a drainpipe connection to a stationary drainpipe built into the wall structure of the unit, the connection accomplished without the requirement of hoses, pipe fittings or the like. The prior art provides a shower and toilet facility which may be utilized with no impositions or restrictions on the user, while the interior is configured to be watertight, with a sealed door, and an easily cleaned interior surface. The prior art preferably provides that the shower and the toilet facility is fabricated as a one-piece, molded fiberglass unit, although other methods of manufacture may also be employed, with satisfactory results. The prior art provides a system that may be utilized as a standalone, portable bathroom facility, or may be implemented in the form of a space saving bathroom, in a building or other structure, or in a camper, boat, or modular housing or the like, or any other location where a small, yet full-featured bathroom is desired.

As the use of assist and support elements such as seating, shelving for accessible reach to body care items, and grab bars to reduce the risks of slip and fall in wet areas are being designed more to attend the aging population rather than mobile population, the installation of such elements is resulting in the increased presence of additional surfaces, transitions, joints, and wall penetrations with their intrinsic waterproofing risks, increased maintenance work, and additional effort to ordinarily keep dry and clean—tasks that the same aging population is paradoxically less equipped to perform.

The transitions between different bathroom materials, units of the same material, and change of planes are notoriously problematic in wet environments, and particularly in areas designated to washing and cleaning, such as bathrooms, where extraneous organic matter combined with moisture comes in contact with transition surfaces. Most commonly, these transitions present a recession and/or change of texture that is difficult to dry and clean, leading to grime build up and bacterial growth.

Furthermore, the different bathroom materials and planes often expand, contract and move in different ratios and directions, causing a gap that is insightful and that invites water infiltration, causing further waterproofing, hygienic and aesthetic concerns. Even if the bathroom materials don't substantially expand, contract and move independently, the mere penetration through surfaces and waterproofing membranes contribute to many water damages and structural failures related to failing wet areas such as walk in showers and other wet areas.

However, the limitation of the modular structures for bathroom is not optimally solved by the prior arts as the conventionally used modular structures are space consuming and heavy in nature. The prior art structure also has safety issues as due to heavy weight, a user is forced to avoid additional weight that may lead to falling of the structures and result in fatalities.

In the view of foregoing, there is a need for at-least one modular bathroom structure with enhanced safety feature, reduced maintenance cost, least area occupancy and adjustable to suit the needs of a user. Further there is a need for a modular bathroom structure with independent assembly with easy accessibility features.

The above mentioned shortcomings, disadvantages and problems are addressed herein, as detailed below.

SUMMARY OF THE INVENTION

The primary object of the embodiments herein is to provide a modular bathroom structure with enhanced safety feature, reduced maintenance cost, least area occupancy and adjustable to suit the needs of a user from various age groups.

Another object of the embodiments herein is to provide a modular bathroom structure with independent assembly with easy accessibility features.

Yet another object of the embodiments herein is to provide a modular shower seat and other appurtenances connected to a wall structure without having direct connection to a wall surface having a support structure.

The various embodiments herein provide a modular shower seat connected to a wall structure comprising a mounting base component, a connecting elongated component and a primary functional component. The mounting base component is fixed against a wall structure through a holding medium. The mounting base component comprises a vertical base plate. The vertical base plate comprises a plurality of fastener holes and a plurality of vertical slots. The connecting elongated component is attached to the mounting base component through a plurality of fastening medium. The connecting elongated component comprises a pair of vertical bases. Each vertical base is orthogonally fixed to the vertical base plate by fitting the vertically opposite brackets into the vertically opposite slots of the vertical base plate. The primary functional component is fixed over the connecting elongated component.

According to one embodiment herein, the modular shower seat provides a functional features of a modular shower seat.

According to one embodiment herein, the primary functional component is selected from the group consisting of a seat, a shelf, a ledge, a substantially horizontal and flat surface to be installed in wet areas.

According to one embodiment herein, the primary functional component is selected from the group consisting of a seat, a ledge for foot rest and for holding body care items, a substantially horizontal and flat surface for supporting fixtures such as lavatories, a substantially horizontal and flat surface for a support of a decorative functional items, or for the assistance in performing body care tasks for a walk-in shower.

According to one embodiment herein, the distance between the vertical bases is manually adjusted by changing the slots as per preferences of the user.

According to one embodiment herein, the vertical base plate, the pair of vertical base and the horizontally flat surface is made up of a corrosion-resisting, non-porous and sturdy material.

According to one embodiment herein, a water resistant plastic guide is applied to the mounting base component before attachment of the connecting elongated component. The plastic guide is a temporary, disposable guide to keep the vertical base plate slots through a backer board and a wall surface installation such as tiles. The plastic guide is implemented till the wall surface installation is ready for attaching the connecting elongated component.

The embodiments herein provide a modular shower seat connected to a wall structure comprising a mounting base component, a connecting elongated component and a primary functional component. The mounting base component is fixed to a wall structure through a fastener or a blocking element. The connecting elongated component comprises a tubular support structure. The tubular support structure is connected to the base through a rectangular blocking element. The tubular support structure comprises a ball hinge at at-least one position along a length. The tubular support structure further comprises a primary base pad. The primary functional component comprises a secondary base pad. The secondary base pad is attached to the tubular support structure over the primary base pad.

According to one embodiment herein, the modular shower seat provides a functional features of a personal care tray.

According to one embodiment herein, the mounting base is manually moveable vertically, horizontally and in angular directions through the at-least one ball hinge.

According to one embodiment herein, the mounting base is automatically moveable vertically, horizontally and in angular directions through the at-least one ball hinge.

According to one embodiment herein, the mounting base component, the connecting elongated component and the primary functional component is made up of a corrosion-resisting, non-porous and sturdy material.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

DETAILED DESCRIPTION OF THE DRAWINGS

Figure 1A:
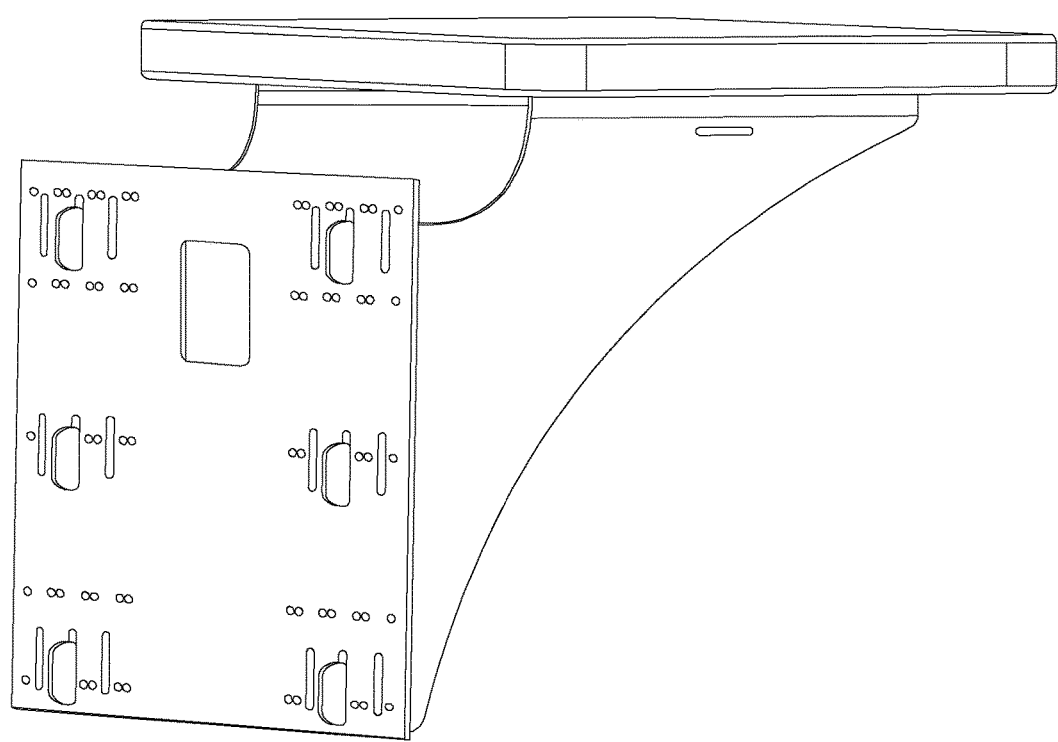
FIG. 1A illustrates a side perspective view of the modular shower seat, according to one embodiment herein.

In the following detailed description, a reference is made to the accompanying drawings that form a part hereof, and in which the specific embodiments that may be practiced is shown by way of illustration. The embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a modular shower seat connected to a wall structure comprising a mounting base component, a connecting elongated component and a primary functional component. The mounting base component is fixed against a wall structure through a holding medium. The mounting base component comprises a vertical base plate. The vertical base plate comprises a plurality of fastener holes and a plurality of vertical slots. The connecting elongated component is attached to the mounting base component through a plurality of fastening medium. The connecting elongated component comprises a pair of vertical bases. Each vertical base is orthogonally fixed to the vertical base plate by fitting the vertically opposite brackets into the vertically opposite slots of the vertical base plate. The primary functional component is fixed over the connecting elongated component.

According to one embodiment herein, the modular shower seat provides a functional features of a modular shower seat.

According to one embodiment herein, the primary functional component is selected from the group consisting of a seat, a shelf, a ledge, a substantially horizontal and flat surface to be installed in wet areas.

According to one embodiment herein, the primary functional component is selected from the group consisting of a seat, a ledge for foot rest and for holding body care items, a substantially horizontal and flat surface for supporting fixtures such as lavatories, a substantially horizontal and flat surface for a support of a decorative functional items, or for the assistance in performing body care tasks for a walk-in shower.

According to one embodiment herein, the distance between the vertical bases is manually adjusted by changing the slots as per preferences of the user.

According to one embodiment herein, the vertical base plate, the pair of vertical base and the horizontally flat surface is made up of a corrosion-resisting, non-porous and sturdy material.

The embodiments herein provide a modular shower seat connected to a wall structure comprising a mounting base component, a connecting elongated component and a primary functional component. The mounting base component is fixed to a wall structure through a fastener or a blocking element. The connecting elongated component comprises a tubular support structure. The tubular support structure is connected to the base through a rectangular blocking element. The tubular support structure comprises a ball hinge at at-least one position along a length. The tubular support structure further comprises a primary base pad. The primary functional component comprises a secondary base pad. The secondary base pad is attached to the tubular support structure over the primary base pad.

According to one embodiment herein, the modular shower seat provides a functional features of a personal care tray.

According to one embodiment herein, the mounting base is manually moveable vertically, horizontally and in angular directions through the at-least one ball hinge.

According to one embodiment herein, the mounting base is automatically moveable vertically, horizontally and in angular directions through the at-least one ball hinge.

According to one embodiment herein, the mounting base component, the connecting elongated component and the primary functional component is made up of a corrosion-resisting, non-porous and sturdy material.

Figure 1B:
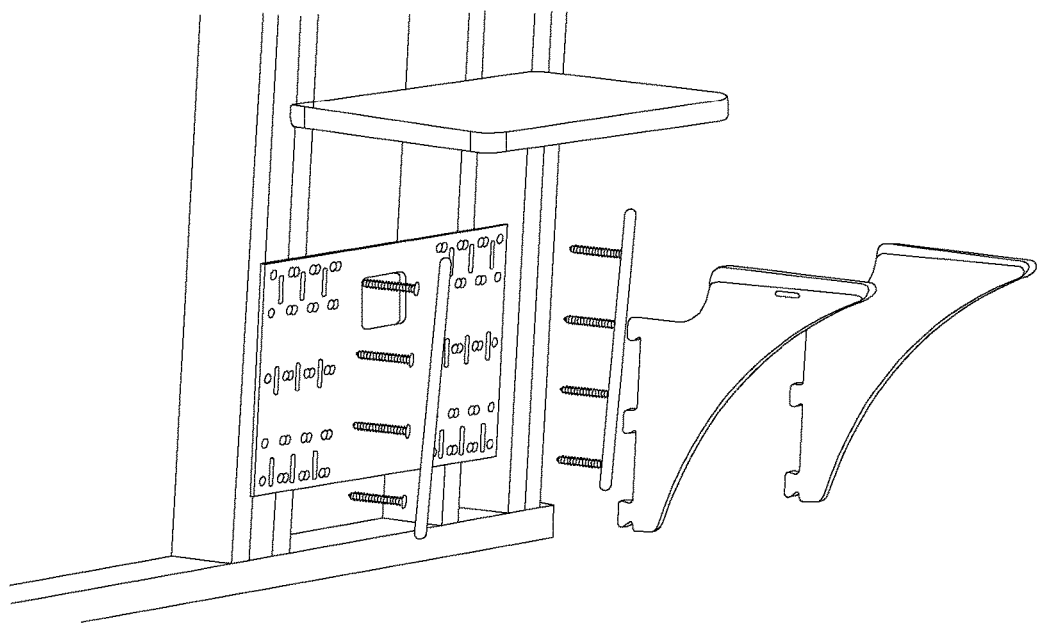
FIG. 1B illustrates an exploded perspective view of the modular shower seat, according to one embodiment herein.

FIG. 1A and FIG. 1B illustrate a side perspective view and an exploded view of the modular shower seat, according to one embodiment herein. With respect to FIG. 1A and FIG. 1B, the shower seat 100 comprises a vertical base plate 101 for mounting the pair of vertical base 102 and the horizontal flat surface 103. The vertical base plate 101 is mounted onto a wall structure through a plurality of fasteners 106. The pair of vertical bases 102 are connected to the vertical base plate 101 in an orthogonal manner forming a tabular base structure. The vertical bases 102 comprises a pair of vertically opposite bracket 104 to be positioned into the slots 105 provided in the vertical base plate 101. The vertical base plate (mounting base) refers to a means of providing structural support and stability to both the horizontal flat surface (primary functional base) 103 and the pair of vertical bases (the connecting components) 102 in a secure manner. The horizontal flat surface 103 is mounted over the vertical bases 102 via anchors and screws fastened through holes located in the vertical bases' flanges 108. The wall trims 107 cover the wall surface slots created to receive the vertical bases.

The vertical base plate transfers a load and stress of the vertical bases and the horizontal flat surface to the wall structure. The vertical base plate is primarily (but not in limited manner) located behind the wall surface, the wall substrate, and the waterproofing membrane. The vertical base plate is primarily made up of a metal or a rigid, stable and durable material for providing a substantial structural support to the vertical bases and the horizontal flat surface.

Figure 2A:
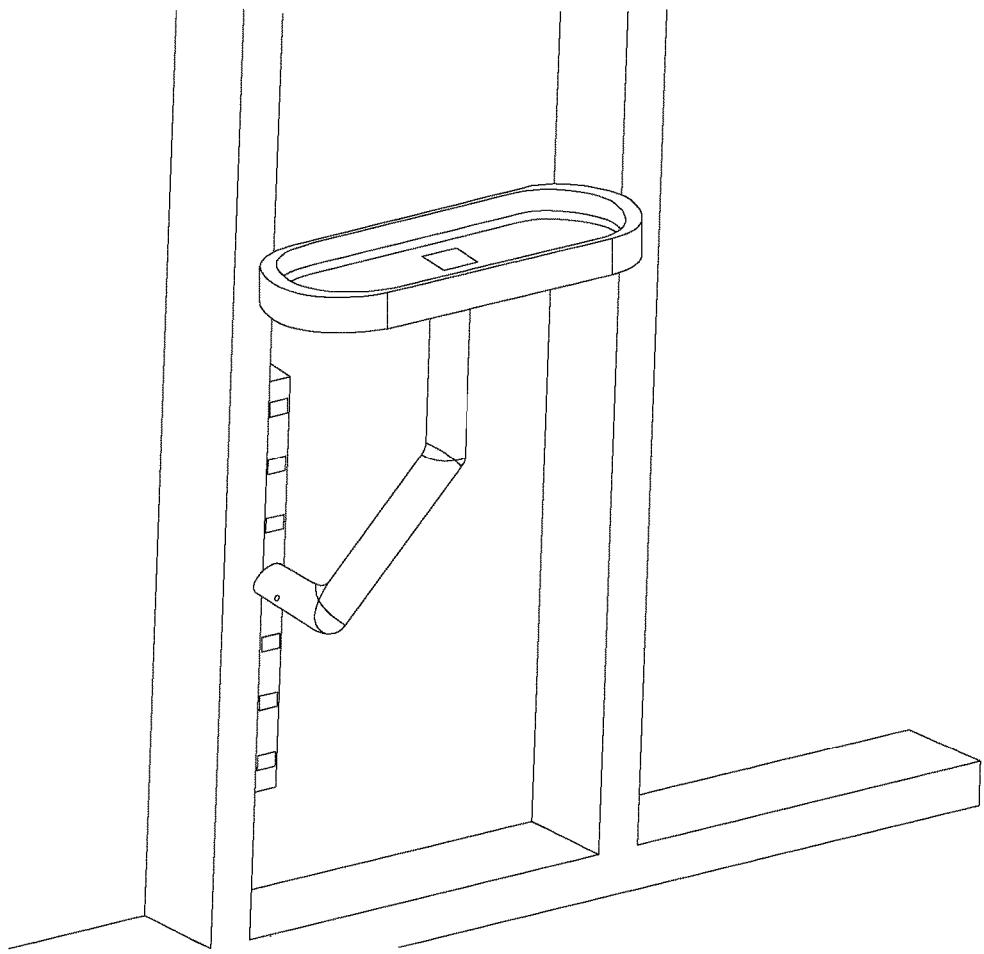
FIG. 2A illustrates a perspective view of the personal care tray, according to one embodiment herein.
Figure 2B:
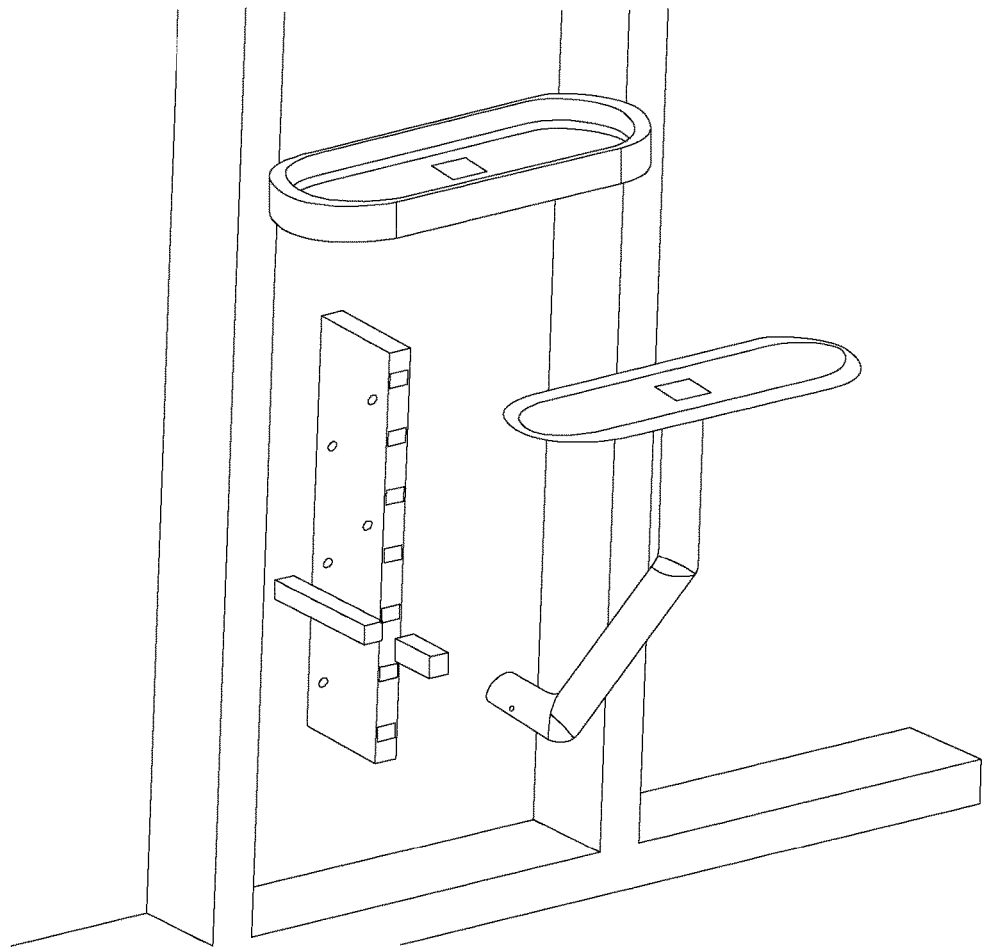
FIG. 2B illustrates an exploded perspective view of the personal care tray, according to one embodiment herein.

FIG. 2A and FIG. 2B illustrates a side perspective view and an exploded view of the personal care tray, according to an embodiment herein. With respect to FIG. 2A and FIG. 2B, the mounting base component 201 is made up of a rigid material or a metal and holds the tubular support structure 202 and the secondary base pad 203. The mounting base component 201 is fixed to a wall structure through one or more fasteners or a blocking element and is further connected to the tubular support structure 202 through a rectangular blocking or holding element 204 and at-least one fastener 205. The tubular support structure 202 further comprises a primary base pad 206. The secondary base pad 203 is attached to the tubular support structure 202 over the primary base pad 206.

The embodiments herein provide a floating shower seat with variety of material to be mounted onto the wall structure (beneath the wall surface) with the help of brackets. The embodiments herein also provide a shower seat and other appurtenances connected to the wall structure without direct contact to the wall surface.

According to an embodiment herein, the shower seat comprises a primary functional component. The primary functional component acts as a main functional element of the shower structure. The primary functional components comprises seats, shelves, ledgers, or other substantially horizontal and substantially flat surfaces to be installed in wet areas and in bathrooms in general, but particularly in walk-in showers, such as seats, ledges for foot rest, for holding body care items, for supporting fixtures such as lavatories, or the support of other decorative or functional items, or for the assistance in performing tasks such as shaving, doing make up, and other personal care activities, but also located elsewhere for any other usage where aid, support and item resting on it is desired by the means of a substantially horizontal and substantially flat surface not touching any surrounding wall surface.

According to another embodiment herein, the primary functional component further comprises accessories, to be installed but not limited to wet areas such as toiletry, bathroom, showers, gyms, spas, bus stops, monuments/parks, cemeteries, stadiums, and airports.

The primary functional component is made of corrosion-resisting, non-porous, sturdy material to withstand the adverse conditions of a wet environment and the load stress submitted while providing the support and assistance which it is intended for.

According to another embodiment, the present invention further comprises a connecting elongated component. The connecting elongated component relates to the means of securing the main functional structure to the surrounding wall structure, while preventing them from touching each other's surfaces, for ease of cleaning, lower maintenance and lower waterproofing failure risks. The connecting elongated element are made of corrosion-resisting metal or similarly rigid and stable material, and can be substantially flat or have a tubular shape, having first and second ends and an intermediate portion in between, where the first end connects to and firmly secures the primary functional structure.

The connecting component holds the primary function structure distant from the nearby wall surface, while providing the necessary structural support needed by the wall-detached functional structure. The connecting elongated component also alternatively provides a secondary function in itself, as being used as a grab bar, where its location and external shape grants such use. The connecting elongated component further alternatively provides a tertiary function in itself, as to hold foldable items over them, such as towels and washcloths, where its location and external shape grants such use.

The second end of the connecting elongated component penetrates the wall surface, the wall substrate and waterproofing membrane when existing, directly connecting to and firmly securing to a mounting base fastened to the wall structure.

According to another embodiment, the present invention further comprises a mounting base component. The mounting base component refers to the means of providing structural support and stability to both the primary functional and the connecting components, securely transferring their load and stress to the wall structure. They are located behind the wall surface, the wall substrate, and the waterproofing membrane when existing, reducing the number of exposed elements in the living side of the wall that require care and maintenance. The mounting base component is made up of metal or similarly rigid, stable and durable material for substantial structural support of the connecting component and its intended use. The mounting base is configured differently for each elongated connecting element type. The mounting base is configured for example to receive brackets. The mounting base is configured as a flat surface that is placed vertically, to be fastened directly over the wall structure surface, or flush to it. In a preferred embodiment, their slots are set as pairs of vertically placed orifices, the upper slot configured to receive at-least three hooks. The multiple sets of slots allow flexibility in determining the desired spacing between brackets.

According to another embodiment herein, the mounting base is further configured to receive tubular shape connecting components. The mounting base is configured in a rectangular hollow section shape, to be embedded into a solid concrete or masonry wall, or fastened directly to a wall frame or blocking element, flush with the wall structure surface. Depending on the wall frame and appurtenance's requirements, the mounting base is installed either horizontally or vertically.

The bathroom features or structures provided in the embodiments herein enhances a safety feature and a utility with least area consumption suited for various age groups. The present bathroom structures have reduced corroding and deterioration of such structure which further reduces chances of bathroom fatalities. The present bathroom features are but not limited to wet areas such as toiletry, bathroom, showers, gyms, spas, bus stops, monuments/parks, cemeteries, stadiums, and airports. The present bathroom features take less space than built-in benches, are maintenance free, provide added accessibility to users with limited mobility or limb paralysis problem, are sturdy in nature, have an aesthetical appeal, high architectural quality (as compared to the more transient nature of the folding benches) and allows easy floor cleansing due to floating design.

According to an embodiment, the prevent invention relates to the installation of structures designed to promote the comfort, enjoyment and physical assistance of users of a wide range of age and mobility condition, in wet areas and bathrooms in general, and in walk-in showers in particular. According to a preferred embodiment herein the structure is a seat that provides support, rest and comfort to the shower user. According to another preferred embodiment, the structure is a tray designed to hold personal care items. The tray rests on a supporting tubular structure that doubles as a grab bar adequate to provide the user support, assistance and balance, and is ideally installed near the seat for convenient access to care items and for grab holding support. In both preferred embodiments, a key characteristic is that their primary functional element—a seat in the first, a tray in the latter, don't touch any surrounding wall surface, but rather exclusively rest and are supported by brackets or bars. Also, the wall structure mounting fasteners are placed behind the wall surface to provide improved aesthetics and decreased maintenance.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims.

I claim:

1. A modular shower seat kit for connecting to a wall structure of a shower, comprising:
    a mounting base component connected to the wall structure, the mounting base component defined as a vertical base plate comprising a plurality of fastener holes and a plurality of vertical slots arranged horizontally and vertically on a left side and a right side of the vertical base plate;
    wherein the plurality of fastener holes allow adjustment of the mounting of the vertical base plate to the wall structure via fasteners and wall trims, and the plurality of vertical slots allowing adjustment of a pair of vertical bases in a horizontal direction to adjust the size of a support component, wherein each vertical base is orthogonally fixed to the vertical base plate by fitting a set of vertically opposite brackets into the vertically opposite slots of the vertical base plate; and
    the support component, wherein the support component is fixed over the pair of vertical bases.

2. The modular shower seat kit according to claim 1 provides a functional features of a modular floating bench.

3. The modular shower seat kit according to claim 1, wherein the support component is selected from the group consisting of a seat, a shelf, a ledge, a substantially horizontal and flat surface to be installed in wet areas.

4. The modular shower seat kit according to claim 1, wherein the support component is selected from the group comprising seats, ledges for foot rest and for holding body care items, a substantially horizontal and flat surface for supporting fixtures, a substantially horizontal and flat surface for a support of a decorative functional item, or for an assistance in performing body care tasks for a walk-in shower.

5. The modular shower seat kit according to claim 1, wherein a distance between the vertical bases is manually adjusted by inserting the vertical bases in different slots horizontally positioned along the vertical base plate.

6. The modular shower seat kit according to claim 1, wherein the vertical base plate, the pair of vertical bases and the support component are made up of a corrosion-resisting material.

7. The modular shower seat kit according to claim 1, wherein a water resistant plastic guide is applied to the mounting base component before attachment of the connecting elongated component.

8. The modular shower seat kit according to claim 7 provides a functional features of a personal care tray.

9. A modular shower seat kit for connecting to a wall structure of a shower, comprising:
    a mounting base component connected to the wall structure, the mounting base component defined as a vertical base plate comprising a plurality of fastener holes and a plurality of vertical slots arranged horizontally and vertically on a left side and a right side of the vertical base plate;

a connecting elongated component, wherein the connecting elongated component comprises a tubular support structure, wherein the tubular support structure is connected to the base through a rectangular blocking element, wherein the tubular support structure comprises a ball hinge at at-least one position along a length, wherein the tubular support structure further comprises a primary base pad; and a support component, wherein the support component comprises a secondary base pad, wherein the secondary base pad is attached to the tubular support structure over the primary base pad.

10. The modular shower seat kit according to claim 9, wherein the mounting base is manually moveable vertically, horizontally and in angular directions through the at-least one ball hinge.

11. The modular shower seat kit according to claim 9, wherein the mounting base is automatically moveable vertically, horizontally and in angular directions through the at-least one ball hinge.

12. The modular shower seat kit according to claim 9, wherein the mounting base component, the connecting elongated component and the support component are made up of a corrosion-resisting material.

* * * * *